United States Patent
Matsunaga et al.

(10) Patent No.: US 6,732,547 B1
(45) Date of Patent: May 11, 2004

(54) METHOD FOR THE TREATING STAINLESS STEEL REFINING SLAG

(75) Inventors: Hisahiro Matsunaga, Chiba (JP); Chikashi Tada, Tokyo (JP); Masato Kumagai, Chiba (JP); Toshikazu Sakuraya, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 09/700,020

(22) PCT Filed: Mar. 2, 2000

(86) PCT No.: PCT/JO00/01235
§ 371 (c)(1),
(2), (4) Date: Nov. 9, 2000

(87) PCT Pub. No.: WO00/53539
PCT Pub. Date: Sep. 14, 2000

(30) Foreign Application Priority Data

Mar. 10, 1999 (JP) .......................................... 11-062752
Feb. 7, 2000 (JP) ....................................... 2000-028821

(51) Int. Cl.$^7$ ............................................... C04B 5/06
(52) U.S. Cl. ............................................................ 65/19
(58) Field of Search ................................... 65/19, 21.2

(56) References Cited

U.S. PATENT DOCUMENTS

| | | | |
|---|---|---|---|
| 964,805 A | * | 7/1910 | Passow ........................ 65/141 |
| 980,606 A | * | 1/1911 | Colloseus ........................ 65/19 |
| 1,051,627 A | * | 1/1913 | Passow .......................... 65/141 |
| 3,054,139 A | * | 9/1962 | Bartholomew et al. ......... 65/19 |
| 3,523,775 A | * | 8/1970 | Rueckl ........................... 65/19 |
| 3,594,142 A | * | 7/1971 | Margesson et al. ............. 65/19 |
| 6,547,959 B1 | * | 4/2003 | Frost |

FOREIGN PATENT DOCUMENTS

| | | | |
|---|---|---|---|
| JP | 8-104553 | * | 4/1996 |
| JP | 8-302418 | * | 11/1996 |

OTHER PUBLICATIONS

Machine translation of JP 8–104553.*
Machine translation of JP 8–302418.*

* cited by examiner

*Primary Examiner*—Sean Vincent
(74) *Attorney, Agent, or Firm*—Young & Thompson

(57) ABSTRACT

The slag in a molten state formed at a step of refining stainless steel is adjusted such that the slag has a basicity in the range of 1.3–4.0, and the slag is mixed with a sulfur-containing material wherein the sulfur is zero or minus in valence, thereby setting the concentration of sulfur in the slag to be not less than 0.2% by weight. The slag is so modified that $Cr^{6+}$ is substantially completely prevented from being eluted and can be effectively utilized as a roadbed material and a reclamation material for civil works. The slag is quenched at such a speed of cooling that the temperature of the slag is decreased from 1200° C. to 400° C. within 48 hours so that noticeable effects are attained.

20 Claims, 3 Drawing Sheets

METHOD FOR THE TREATING STAINLESS STEEL REFINING SLAG

TECHNICAL FIELD

This invention relates to a method for treating slag arising from the refining of stainless steel. In particular, the invention proposes a technique for effectively preventing harmful substances from becoming eluted from the slag, which substances cause anxiety in recycling the slag.

BACKGROUND ART

Effective utilization of slag which is a by-product formed during steel refining is considered to be a problem of importance by steel manufacturers from the viewpoints of reducing the cost in steel production and also saving the area in a yard provided exclusively for the slag on the plant premise. In order for the slag induced from steel production to be effectively utilized, it is generally predominantly used by recycling into a sintering plant, or as a roadbed material, a reclamation material for civil works and the like. For instance, with regard to the slag applied to the reclamation material for civil works, a process for modifying and solidifying the slag by use of an anti-powdering agent is proposed as described in Kawatetsu Technical Bulletin (1986, vol. 18, No. 1, p. 20–24).

A noticeable difference between the slag formed by refining stainless steel (hereinafter referred to simply as "stainless steel slag") and the slag formed by producing any other steel is that the former slag has chromium oxide in a content of several percentages as determined in terms of Cr. Although this content is not beyond the values regulated for the reclamation of industrial waste, the chromium oxide sometimes elutes as a hexavalent chromium ion ($Cr^{6+}$) into water. To utilize the stainless steel slag as a roadbed material or a reclamation material for civil works, therefore, it is desired that strict measures be taken such that environmental pollution by no means arises from the elution of $Cr^{6+}$ even in the distant future.

Several techniques have thus far been proposed which are designed to prevent $Cr^{6+}$ from being eluted from the stainless steel slag. For example, Japanese Unexamined Patent Application Publication No. 06-171993 discloses a process in which chromium oxide-containing slag is modified by adding an aluminum ash in an amount of 1–30% by weight and a magnesia type material in an amount of 0.5–15% by weight, respectively, based on the total cumulative weight of the stainless slag in a molten state. However, such a process cannot be said to be satisfactory for slag treatment because $Cr^{6+}$ elutes in some instances. The process further forms dicalcium silicate in a rather large quantity, and in this case, the slag often becomes powdered because the silicate compound invites crystalline transformation.

Furthermore, Japanese Unexamined Patent Application Publication No. 08-104553 discloses a process in which an inert gas is blown into chromium oxide-containing slag in a molten state formed when stainless steel is refined by decarburization and thereafter subjected to reduction treatment, followed by addition of a divalent sulfur-containing material with stirring, such that the concentration of sulfur in the slag is set to be not less than 0.20% by weight.

Even with this technique employed, however, there is still a danger of $Cr^{6+}$ becoming eluted depending on the treating conditions of the slag. In instances where stainless steel slag is treated, particularly when it contains chromium at as high a concentration as 2.5% by weight or above, the conventional art appears to make it difficult for the elution of $Cr^{6+}$ to be prevented nearly completely. This fact poses a further problem in that if a region with a high concentration of chromium is locally present in the slag, it is impossible to modify the slag stably.

An object of the present invention is to modify chromium oxide-containing slag formed at a step of refining stainless steel, thereby preventing $Cr^{6+}$ from elution from the slag in a substantially complete manner. In other words, this object is to propose a method for treating stainless steel slag, which permits the slag to be effectively utilized as a roadbed material or a reclamation material for civil works without suffering any fear of environmental pollution. Above all, a method for the treatment of stainless steel slag is proposed in which even when the concentration of chromium in the slag is high and beyond 2.5% by weight, $Cr^{6+}$ is substantially completely prevented from being eluted from the slag.

DISCLOSURE OF THE INVENTION

In order to produce stainless steel, a variety of processes have been practically applied which include a process of Electric Furnace-AOD (Argon Oxygen Decarburization), a process of Converter-VOD (Vacuum Oxygen Decarburization), a process of Chromium Ore Melting Reduction-Converter Decarburization) and the like. Using different production conditions, the present inventors have made many inspections as to how $Cr^{6+}$ elutes into water in various sorts of stainless steel slag resulting from these processes.

Consequently, these inventors have found that when molten slag having a low basicity is mixed with a strongly reductive material containing sulfur or a sulfide so as to increase the concentration of sulfur in the slag, $Cr^{6+}$ can be almost completely prevented from being eluted. It has also been discovered that this beneficial effect is influenced by the speed of cooling at which the molten slag is cooled after being mixed with the sulfur-containing material and that surprising results can be obtained especially by quenching the slag. Here, the basicity denotes the ratio of the content (% by weight) of CaO in the slag to the content (% by weight) of $SiO_2$ in the slag, i.e., CaO (% by weight)/$SiO_2$ (% by weight) (hereinafter defined as such).

Based on the above-described inventive concepts, the present invention is constituted as follows:

Namely, this invention provides a method for the treatment of slag resulting from the refining of stainless steel, which comprises adjusting slag in a molten state formed at a step of refining stainless steel such that the slag has a basicity in the range of 1.3–4.0, and mixing the slag with a sulfur-containing material wherein the sulfur is zero or minus in valence, thereby setting the concentration of sulfur in the slag to be not less than 0.2% by weight.

As the processes for mixing the slag with the sulfur-containing material in this treatment method, the following three embodiments are preferred; that is, (1) a mixing process in which molten slag having been adjusted in its basicity is allowed to flush in a slag receiver after or during incorporation of the sulfur-containing material in the slag receiver, (2) a mixing process in which molten slag having its basicity adjusted is maintained in a slag receiver capable of heating the slag, followed by addition of the sulfur-containing material to the slag receiver, and (3) a mixing process in which after molten stainless steel is tapped from a refining furnace, the sulfur-containing material is added to molten slag that has been left in the furnace and adjusted in its basicity.

In the treating method according to the present invention, yet another mixing process is preferred in which stainless steel is refined in an electric furnace, and the sulfur-containing material is added with stirring to molten slag having been adjusted in its basicity with molten stainless steel made present in the refining furnace.

In addition, in all of the above mixing processes, the molten slag should preferably be stirred by at least one of a process for rocking a slag-accommodated receiver, and a process for blowing a gas into the slag.

Besides and preferably, in all of the above mixing processes, FeS should be used as the sulfur-containing material.

Also in all of the above mixing processes, a boron oxide-containing material should preferably be further added at a step of mixing the sulfur-containing material. In this case, the concentration of $B_2O_3$ in the slag should more preferably be set to be not less than 0.1% by weight.

Lastly, in all of the above mixing processes, there is provided a process for quenching the slag at such a speed of cooling that the temperature of the slag is decreased within 48 hours from 1200° C. to 400° C. when the slag is cooled after being mixed with the sulfur-containing material. This quenching process is by far more conspicuously conducive to the desired effects of the present application, and therefore, is especially desirable and important. The quenching noted here should preferably be performed using at least one selected from the group consisting of a cooling process by water grinding, a cooling process by air grinding, and a cooling process by sprinkling of water in an amount larger than 0.05 t/h based on 1 t of the slag flushed in a thickness within 2 m and having a temperature higher than 1200° C.

BEST MODE FOR CARRYING OUT THE INVENTION

With regard to various sorts of slag arising from refining of stainless steel and having a content of chromium in the range of 0.5–8.0% by weight, the present inventors have made experimental studies of how the elution of $Cr^{6+}$ is influenced by the concentration of sulfur in the slag and the basicity of the slag, the slag having been mixed with a sulfur-containing material wherein the sulfur is zero or minus in valence.

Figure 1:
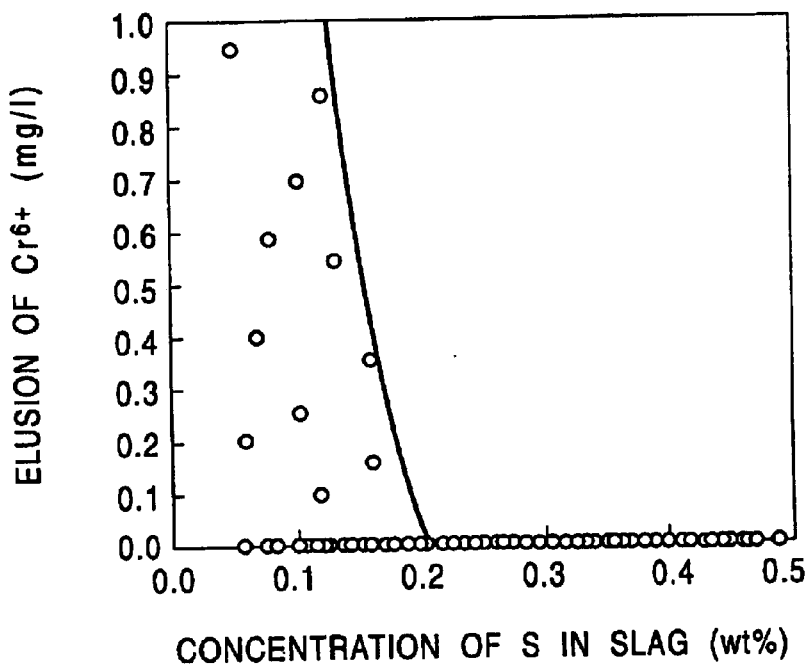
FIG. 1 is a view showing the relationship between the concentration of S and the elution of $Cr^{6+}$ in slag (basicity: 3.0–4.0) before being modified.

In FIG. 1, there are shown the results obtained as to the relationship between the concentration of sulfur in slag having been mixed with the sulfur-containing material and the elution of $Cr^{6+}$ when the basicity of the slag is set within the range of 3.0–4.0 at the time stainless steel is melted. Here, the elution test of $Cr^{6+}$ was conducted as stipulated by Notice 46 of Japan's Environment Agency that was regulated as most stringent. From FIG. 1, it has been found that $Cr^{6+}$ tends to become eluted when the concentration of sulfur in the slag fails to reach 0.20% by weight.

Figure 2:
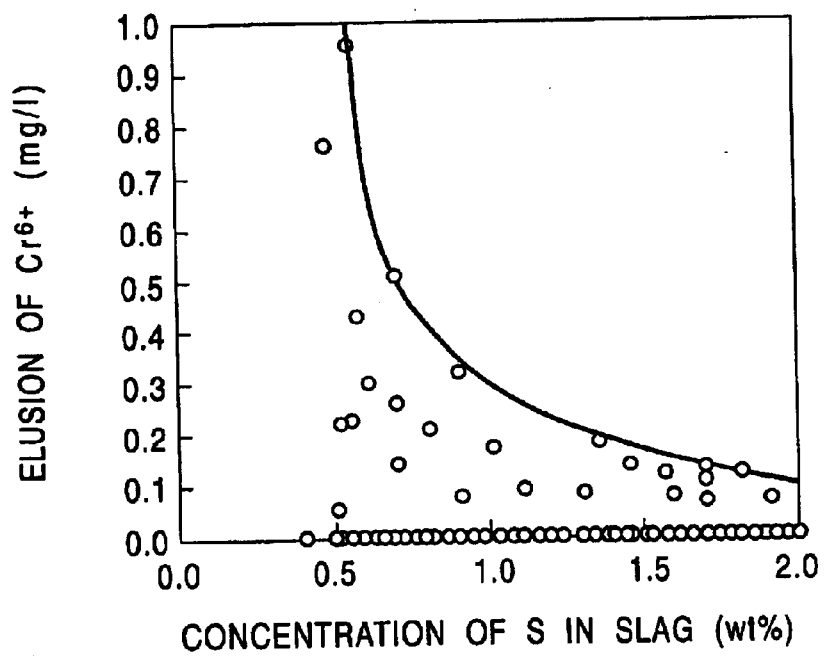
FIG. 2 is a view showing the relationship between the concentration of S and the elution of $Cr^{6+}$ in slag (basicity: beyond 4.0) before being modified.

In FIG. 2, there are shown the results obtained as to the relationship between the concentration of sulfur in slag having been mixed with the sulfur-containing material and the elution of $Cr^{6+}$ when the basicity of the slag is set within the range of 4.0–5.0 at the time stainless steel is melted. As is seen in this figure, $Cr^{6+}$ has been found to often elute depending on the level of basicity even when the slag is treated to contain sulfur at a concentration of 1.0% by weight by addition of the sulfur in a large quantity.

Figure 3:
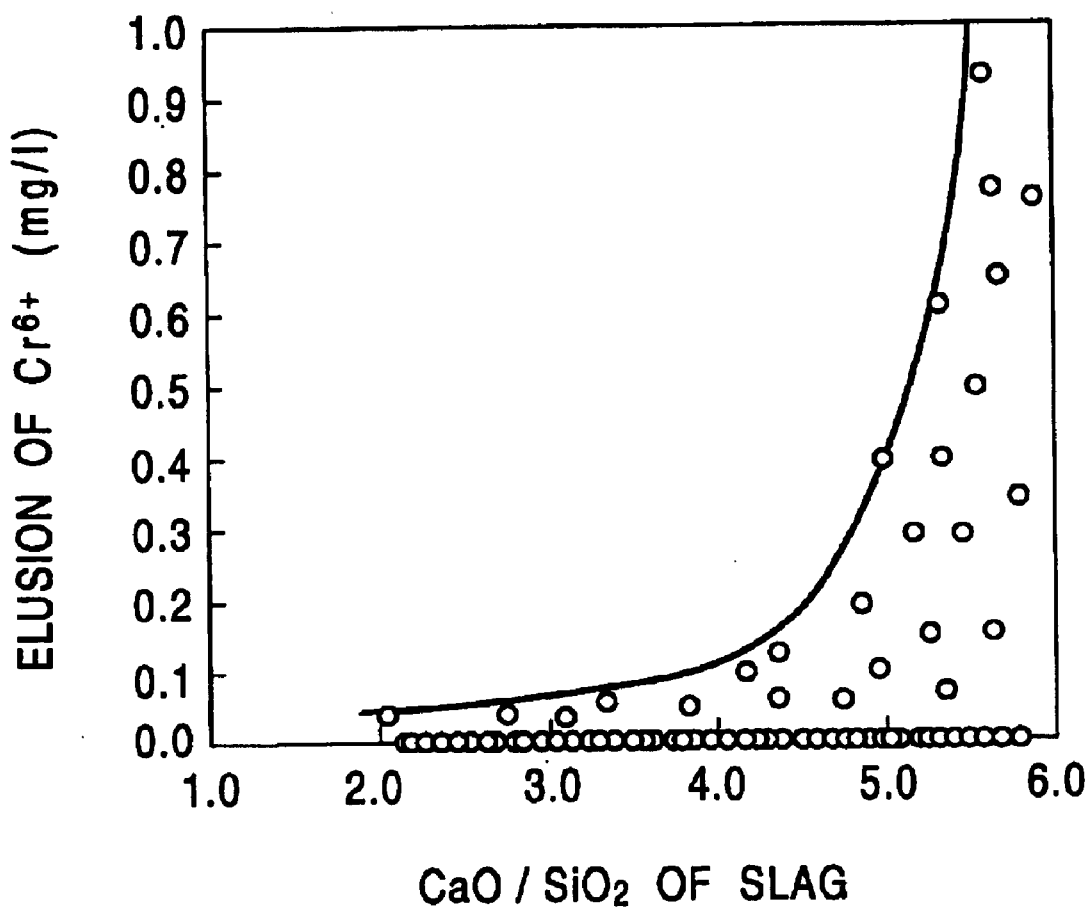
FIG. 3 is a view showing the relationship between the basicity of slag and the elution of $Cr^{6+}$.

Thus, the present inventors have made further examinations of what effects the basicity of slag has on the elution of $Cr^{6+}$. FIG. 3 shows the relationship between the basicity of stainless steel slag having as low a concentration of sulfur as 0–0.1% by weight and the elution of $Cr^{6+}$. From FIG. 3, it has proved that the elution of $Cr^{6+}$ tends to be great as the basicity of the slag increases, and this tendency becomes remarkable when the basicity exceeds 4.0. The reason behind this is that when the basicity of the slag is high and beyond 4.0, the sulfur-containing material would presumably be difficult to diffuse into the slag. Even when a boron oxide-containing material effective for diffusion is added to this system, the sulfur-containing material has been found to be insufficiently diffusive as will be described later.

Figure 4:
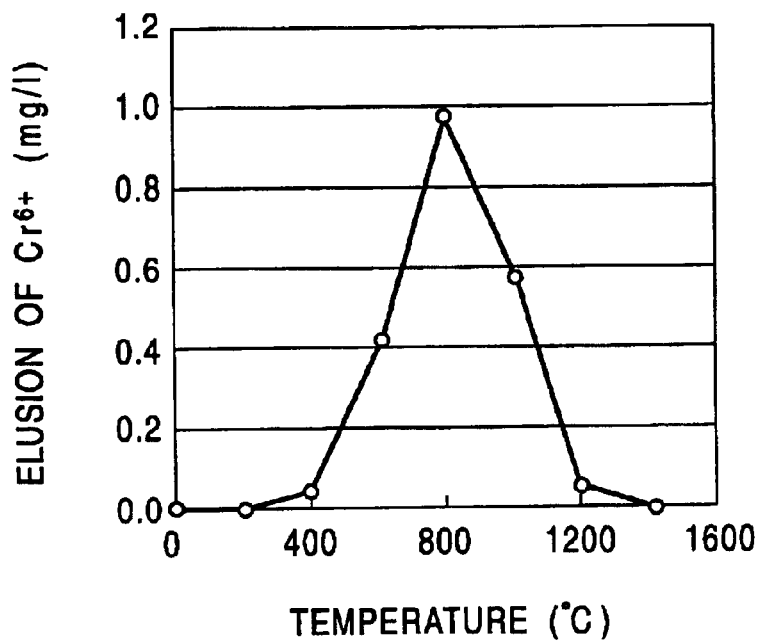
FIG. 4 is a view showing the relationship between the temperature of subjecting slag to heat treatment and the elution of $Cr^{6+}$.

Further examinations have been made of the temperature at which $Cr^{6+}$ is generated. FIG. 4 shows the relationship between the temperature of subjecting slag to heat treatment and the elution of $Cr^{6+}$ when stainless steel slag of 2.5 in basicity, 0.22% by weight in sulfur concentration and less than 0.05 mg/l in $Cr^{6+}$ elution is heat-treated in an atmospheric environment for 100 hours. It has been found from FIG. 4 that $Cr^{6+}$ is likely to be generated in a temperature region of 400–1200° C.

Focusing on this phenomenon, the present writers have examined the relationship between the speed of cooling of slag and the elution of $Cr^{6+}$. It has been revealed, as a result, that the elution of $Cr^{6+}$ can be controlled by controlling the speed of cooling at which the slag is cooled between 1200–400° C.

Figure 5:
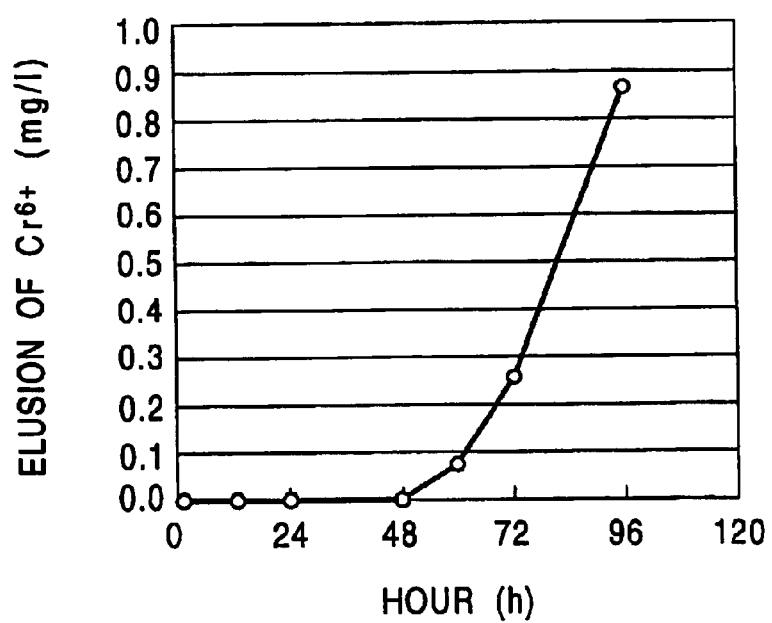
FIG. 5 is a view showing the relationship between the time required for the temperature of slag to be decreased from 1200° C. to 400° C. and the elution of $Cr^{6+}$.

FIG. 5 shows the relationship the time required for stainless steel slag to be cooled from 1200° C. to 400° C. and the elution of $Cr^{6+}$, which slag has a basicity of 2.5, a sulfur concentration of 0.22% by weight and a chromium content of 3.5% by weight. It has thus been found that the elution of $Cr^{6+}$ can be reduced to be not larger than 0.05 mg/l by setting the time required for the slag is cooled from 1200° C. to 400° C. to be within 48 hours.

Such a quenching process has been first found by the present inventors. The conventional art described under the heading of Background Art is directed to controlling of the compositions of slag by addition of a divalent sulfur-containing material, an aluminum ash or a magnesia type material. This conventional art does not in any way disclose or suggest a quenching process for cooling slag between 1200–400° C. and within 48 hours.

In the light of the results obtained from the foregoing examinations, further studies have been made to find that $Cr^{6+}$ can be prevented from being eluted in a substantially complete manner by setting the basicity of stainless steel slag to be not greater than 4.0 and the concentration of sulfur in the slag to be not less than 0.2% by weight. In this case, it is more desirable that the slag be mixed with a sulfur-containing material, followed by quenching at such a speed of cooling that the slag is cooled from 1200° C. to 400° C. within 48 hours, so that significantly superior effects are obtainable.

However, the concentration of sulfur in slag should be set to be not less than 0.2% by weight because, when such concentration is too high, part of the slag remaining in a refining furnace is liable to increase the concentration of sulfur in molten steel at subsequent steps of stainless steel refining. Alternatively, this treatment may be performed by use of another slag receiver. If the basicity of the slag is less than 1.3, the molten steel causes insufficient desulfurization, arousing a fear of the components of steel becoming defective. Hence, the basicity of the slag is required to be 1.3 or above.

In the present invention, the basicity of slag formed at a step of stainless steel refining, i.e., the weight ratio of $CaO/SiO_2$, is set to be in the range of 1.3–4.0 as evidenced by the above-described inventive concepts. The reason is because a basicity more than 4.0 is less effective in preventing $Cr^{6+}$ from elution, whereas a basicity less than 1.3 fearfully gives faulty components of molten steel. The basicity is more preferably in the range of 1.5–3.0, still more preferably in the range of 1.5–2.5. The levels of basicity may be adjusted by adding, to slag that has been formed, a source for CaO or $SiO_2$ depending on the basicity of the slag. It goes without saying that if slag is formed by chance with a basicity within the above range, no adjustments of the basicity need to be made by addition of CaO or $SiO_2$.

From the viewpoints of facilitating reduction of $Cr^{6+}$ or preventing oxidation of $Cr^{6+}$, which chromium ion is present in slag, it is effective to mix the slag with a sulfur-containing material wherein the sulfur is zero or minus in valence. For example, it is preferred that materials be chosen in which sulfur is contained, FeS be mixed, or blast furnace slag be mixed.

With regard to the timing of incorporating the above-mentioned sulfur-containing material in slag, it is not desirable to mix such material during blowing refining by decarburization because the concentration of sulfur in the slag is decreased by vaporization desulfurization, while the concentration of sulfur in stainless steel is increased by the input S. If the slag becomes solidified or loses flowability, the sulfur-containing material fails to sufficiently uniformly disperse in the slag with eventual reduction in elution-preventing property. Thus, the sulfur-containing material is preferably mixed after refining is completed, particularly between when the slag is held highly fluid after reduction refining is completed and when the slag is maintained in a molten state before it is solidified.

Also preferably, the sulfur-containing material is uniformly incorporated in molten slag. As the specific processes for this incorporation, there may be mentioned mixing of a boron oxide-containing material, elevating the temperature of slag by oxygen blowing, and stirring of molten slag.

The boron oxide-containing material is capable of reducing the viscosity of slag and hence is effective in dispersing the sulfur-containing material already mixed in the slag. Namely, a boron oxide compound when being mixed permits the sulfur-containing material to be diffused in the slag without the aid of rocking of a refining furnace, or stirring of the slag by top or bottom blowing of an inert gas.

In the present invention, therefore, the boron oxide-containing material is preferably mixed at a step in which the sulfur-containing material is mixed. To this end, the boron oxide-containing material may be incorporated previously to, subsequently to, or simultaneously with the mixing of the sulfur-containing material. As the boron oxide-containing material, there may be exemplified colemanite, borosilicate glass and sodium borate.

Further, the boron oxide-containing material is effective in preventing slag from being powdered during cooling of the slag. Also in this respect, this boron oxide-containing material when being mixed is useful in modifying the slag. In order to allow powdering-preventing property to be effectively exhibited, the boron oxide-containing material is preferably mixed such that the concentration of $B_2O_3$ in the slag is not less than 0.1% by weight. However, if the concentration of $B_2O_3$ in the slag is made too high, the associated refractories are rapidly impaired so that the concentration of $B_2O_3$ in the slag is desirably set to be less than about 0.5% by weight. The above mixing of materials is effective for molten slag not only in a refining container such as an AOD furnace, a converter or a VOD furnace, but also in a slag pot.

Preferably, the sulfur-containing material is mixed after the temperature of slag is elevated utilizing an exothermic reaction in which Fe and FeO in the slag are oxidized into $Fe_2O_3$ by blowing oxygen into the slag. This temperature elevation makes the slag less viscous and hence permits the sulfur-containing material to be easily diffusive in the slag.

Preferably, a sulfur-containing material bearing a sulfur of zero or minus valence is easily diffused in molten slag, which slag results from the refining of stainless steel and contains chromium oxide and has a basicity ($CaO/SiO_2$) in the range from 1.3 to 4.0, by incorporating the sulfur-containing material in a slag pot, then by flushing the molten slag in the pot, and finally by blowing an inert gas such as $N_2$, Ar or the like into the molten slag through a lance or the like. Also preferably, a sulfur-containing material bearing a sulfur of zero or minus valence is easily diffused in slag, which slag results from the refining of stainless steel and contains chromium oxide and has a basicity ($CaO/SiO_2$) in the range from 1.3 to 4.0, by placing the slag in a molten state in a furnace that can heat the slag, then by mixing the slag with the sulfur-containing material together with a boron oxide-containing material, and finally by blowing an inert gas such as $N_2$, Ar or the like into the molten slag through a lance or the like. Rocking of the furnace capable of heating the slag is also preferred because the sulfur-containing material is made diffusive in the slag. When the boron oxide-containing material is mixed, still better results can be produced.

The furnace capable of heating slag according to the present invention is, for example, an electric furnace, a converter, a VOD furnace, an AOD furnace or the like. These furnaces are not particularly restricted so long as they can heat slag. In such a furnace, the slag can be placed in a cold, semi-molten or molten state. Here, the state in which the slag is placed may be a state in which the slag is left in a converter, a VOD furnace or the like after refining in the furnace and tapping of molten steel therefrom, or a state in which the slag is flushed in another receiver after refining and is maintained in a cold, semi-molten or molten state in the receiver. When the slag is allowed to remain in a furnace after the molten steel is tapped, it is desired that the slag does not nearly contain molten steel. The reason is because the remaining molten steel involves sulfur at an increased concentration and hence acts as an impurity during subsequent refining, failing to warrant reuse. Thus, the remaining molten steel needs to be removed together with the slag, but in an unecononomical manner.

In addition to mixing of the above-mentioned boron oxide-containing material, stirring of molten slag is effective in promoting homogeneity of the slag. As the stirring process, there may be illustrated a process in which rocking of a refining furnace and/or blowing of a gas are effected with respect to molten slag formed after tapping of stainless steel from the furnace by decarburization refining and subsequent reduction treatment. When an electric furnace is employed, effective stirring is attainable because electrification is possible.

Stirring induced from an electrification effect in the electric furnace is carried out by subjecting molten steel to a magnetic field while an electric current is being directly or indirectly passed through the molten steel with the molten steel left in the furnace. More specifically, an electric current in the molten steel and an external magnetic field cooperate with each other in providing fluidity in the molten steel, thereby stirring the slag as well. This stirring through the electrification effect can be performed after or during tapping of the molten steel.

When the above-mentioned sulfur-containing material is mixed into slag, the content of sulfur in molten steel tends to necessarily increase. Hence, the time required for heating through electrification is effected after mixing of the slag with the sulfur-containing material is set to be as short as possible, or stirring through electrification is effected after mixing of the slag with the sulfur-containing material at the time the quantity of the molten steel remaining in the furnace becomes small at a terminal stage of tapping works. This is preferred in holding minimum the displacement of sulfur to the molten steel.

In the case of gas blowing, an inert gas is preferably employed in consideration of the fact that an oxidative gas such as oxygen or air oxidizes FeS which would escape outside in the form of a $SO_x$ gas and hence would fail to remain in slag. An example of the inert gas is $N_2$ gas or Ar gas, and flow rate of the inert gas is set preferably in the range of about 0.5–2.5 $m^3$/min based on 1 t of the slag. The gas blowing process may be either one of a process for blowing a gas from a bottom blowing port, and a process for blowing a gas by lance immersion from a top.

A homogeneous mixing property derived by mixing the above-mentioned boron oxide-containing material and by stirring molten slag can be attained even when both processes are effected individually. Use of these processes in combination provides such a property more remarkably and hence permits the slag to be efficiently modified.

In the present invention, stainless steel slag in a molten state after being mixed with the sulfur-containing material is preferably quenched at such a speed of cooling that the temperature of the molten slag is decreased from 1200° C. to 400° C. within 48 hours. The cooling means used here is not particularly restricted. This quenching means may be illustrated by a water grinding process, an air grinding process, and a process in which cooling is performed by sprinkling of water in an amount larger than 0.05 t/h based on 1 t of slag flushed to have a thickness within 2 m and a temperature higher than 1200° C. These processes can be used singly or in combination.

EXAMPLES

Example 1

Slag modification was tested by the use of a decarburization furnace with a capacity for refining 100 t of stainless steel. This test was directed to slag left in a top-blowing and bottom blowing converter after tapping of stainless steel that has been subjected to decarburization refining and subsequent reduction treatment. This slag was adjusted in its basicity in the range of 1.3–1.4, where needed, by addition of CaO or $SiO_2$ at every charging. As a sulfur-containing material, FeS with a valence of minus 2 was used. As a boron oxide-containing material, colemanite, borosilicate glass and sodium borate were formulated as shown in Table 1-1 and Table 1-2 and were added to the slag having been adjusted in its basicity and left in the furnace. Also illustrated were instances in which stirring was carried out by bottom blowing of an inert gas, top blowing of an inert gas, and rocking of the furnace under the conditions tabulated in Table 1-1 and Table 1-2. In each such instance, the slag was flushed in a slag pot after mixing treatment was completed. The cooling conditions of the slag were also tabulated in Table 1-1 and Table 1-2.

Ten or more samples were collected from a cooled slag of every charging, and 10 more cycles of charging under each set of conditions were performed. Analysis was made of the components such as CaO, $SiO_2$, sulfur, $B_2O_3$ and the like. Further, the elution of $Cr^{6+}$ was tested in accordance with Notice 46 stipulated by Japan's Environment Agency. The results obtained for the range of adjusted basicity (CaO/$SiO_2$, ratio by weight percentage), the concentration of sulfur after treatment, the concentration of $B_2O_3$ and the detection ratio of $Cr^{6+}$ are shown also in Table 1-1 and Table 1-2. Here, the detection ratio of $Cr^{6+}$ denotes, with respect to the total number of tests, the ratio of the number of tests in which the concentration of $Cr^{6+}$ was determined to be greater than 0.05 mg/l under each set of conditions in the elution test.

In each example, it has been found that although the concentration of chromium in slag was great and beyond 2.5% by weight, the elution of $Cr^{6+}$ was nil as evidenced by Table 1-1. It has also been found that when the boron oxide-containing material is mixed, $Cr^+$ can be prevented from being eluted, and at the same time, the slag can be solidified without powdering.

Example 2

In the same manner as in Example 1, tests were conducted except that the procedures of mixing of the stainless steel slag already adjusted in its basicity and the sulfur-containing material were varied, and the treating conditions in the electric furnace were varied. The test conditions were tabulated in Table 2-1 and Table 2-2.

Namely, a 50 t-capacity slag pot was used as a slag receiver in which slag was flushed. Into the pot were mixed the sulfur-containing material and, where needed, the boron oxide-containing material. After the mixing (Examples 18, 20, 27, 29 and 30 and Comparative Examples 10, 13, 17 and 18) or while the mixing (Examples 17, 19, 21, 26 and 28 and Comparative Examples 8, 11, 12, 15 and 16), each grade of stainless steel slag tabulated in Table 2-1 and Table 2-2 was flushed in a quantity of 10–50 t.

On the other hand, each grade of stainless steel slag was charged in a cold or molten state and in a quantity of 10–50 t into a converter, an electric furnace or the like. After being made molten, the slag was mixed with the sulfur-containing material and, when needed, also with the boron oxide-containing material.

In these processes, FeS or water-ground slag in a blast furnace was used as the sulfur-containing material, whereas colemanite, borosilicate glass or sodium borate was used as the boron oxide-containing material. In part of the processes, stirring was further carried out by blowing $N_2$ gas into the slag for 1 minute, or by rocking the furnace.

Ten or more samples in both the examples and the comparative examples were collected from a cooled slag of every charging, and 10 more cycles of charging under each set of conditions were performed. Analysis was made of the components such as CaO, $SiO_2$, sulfur, $B_2O_3$ and the like. Further, the elution of $Cr^{6+}$ was tested in accordance with Notice 46 stipulated by Japan's Environment Agency. The results obtained for the range of adjusted basicity (CaO/$SiO_2$, ratio by weight percentage), the concentration of sulfur after treatment, the concentration of $B_2O_3$ and the detection ratio of $Cr^{6+}$ are shown also in Table 2-1 and Table 2-2. Here, the detection ratio of $Cr^+$ denotes, with respect to the total number of tests, the ratio of the number of tests in which the concentration of $Cr^{6+}$ was determined to be greater than 0.05 mg/l under each set of conditions in the elution test.

The detection ratio of $Cr^+$ was 0% in each example and was more than 1.5% by weight in each comparative example. Also in each example, the slag could be solidified with no powdering involved when the boron oxide-containing material was mixed.

TABLE 1-1

| No. | Basicity of slag (CaO/$SiO_2$) | Concentration of Cr in slag before modification (wt %) | Sulfur-containing material Kind | Amount (kg/t · slag) | Boron oxide-containing material Kind | Amount (kg/t · slag) | Top-blown gas ($Nm^3$/min · t-slag) | Bottom-blown gas ($Nm^3$/min · t-slag) |
|---|---|---|---|---|---|---|---|---|
| Examples | | | | | | | | |
| 1 | 1.3 to 4.0 | 2.5 to 6.1 | — | — | — | — | 0 | 0 |
| 2 | 1.3 to 4.0 | 2.5 to 8.2 | FeS | 10 | — | — | 0 | 0 |
| 3 | 1.3 to 4.0 | 2.5 to 5.8 | FeS | 5 | Colemanite | 5 | 0 | 0 |
| 4 | 1.3 to 4.0 | 2.5 to 7.5 | FeS | 5 | Colemanite | 3 | 0 | 0 |
| 5 | 1.3 to 4.0 | 2.5 to 7.4 | FeS | 5 | Borosilicate glass | 17 | 0 | 0 |
| 6 | 1.3 to 4.0 | 2.5 to 5.5 | FeS | 5 | — | — | 1 | 0 |
| 7 | 1.3 to 4.0 | 2.5 to 7.2 | FeS | 5 | — | — | 0.5 | 0 |
| 8 | 1.3 to 4.0 | 2.5 to 6.7 | FeS | 5 | — | — | 0 | 1 |
| 9 | 1.3 to 4.0 | 2.5 to 6.2 | FeS | 5 | — | — | 0 | 0 |
| 10 | 1.3 to 4.0 | 2.5 to 8.0 | FeS | 5 | Colemanite | 5 | 0 | 0 |
| 11 | 1.3 to 4.0 | 2.5 to 6.5 | FeS | 5 | Borosilicate glass | 12 | 0 | 1 |
| 12 | 1.3 to 4.0 | 2.5 to 7.2 | FeS | 5 | Sodium borate | 4 | 0 | 0 |
| Comparative Examples | | | | | | | | |
| 1 | 1.3 to 4.0 | 0.4 to 6.8 | FeS | 2 | — | — | 1 | 0 |
| 2 | 1.3 to 4.0 | 0.5 to 7.1 | FeS | 2 | Colemanite | 5 | 0 | 0 |
| 3 | 4.1 to 5.5 | 0.4 to 5.5 | FeS | 20 | — | — | 0 | 0 |
| 4 | 4.1 to 5.5 | 0.4 to 7.7 | FeS | 10 | Colemanite | 5 | 0 | 0 |
| 5 | 4.1 to 5.5 | 0.4 to 7.7 | FeS | 10 | Colemanite | 10 | 0 | 0 |
| 6 | 4.1 to 5.5 | 0.6 to 7.3 | FeS | 10 | Borosilicate glass | 17 | 1 | 1 |
| 7 | 1.3 to 4.0 | 0.5 to 7.1 | FeS | 5 | Colemanite | 5 | 0 | 0 |

*Use of coke having a high concentration of S
** Cooling by water grinding
*** Cooling by air grinding

TABLE 1-2

| No. | Number of furnace rocking | Time required for cooling from 1200 to 400° C. (h) | Water-spray cooling condition Thickness of slag (m) | Amount of water spray (t/h-t · slag) | Concentration of S in slag (wt %) | Concentration of $B_2O_3$ in slag (wt %) | Detection of $Cr^{6+}$ (%) |
|---|---|---|---|---|---|---|---|
| Examples | | | | | | | |
| 1 | 0 | 24 | 1.5 | 0.08 | 0.21 to 0.29* | — | 0.0 |
| 2 | 0 | 48 | 2 | 0.05 | 0.39 to 0.65 | — | 0.0 |
| 3 | 0 | 48 | 1 | 0.05 | 0.21 to 0.40 | 0.19 to 0.38 | 0.0 |
| 4 | 0 | 12 | 0.5 | 0.2 | 0.21 to 0.39 | 0.10 to 0.25 | 0.0 |
| 5 | 0 | 48 | 2 | 0.2 | 0.22 to 0.41 | 0.17 to 0.37 | 0.0 |
| 6 | 0 | 0.01** | — | — | 0.21 to 0.40 | — | 0.0 |
| 7 | 0 | 24 | 1.5 | 0.08 | 0.21 to 0.37 | — | 0.0 |
| 8 | 0 | 24 | 2 | 0.1 | 0.22 to 0.40 | — | 0.0 |
| 9 | 3 | 48 | 2 | 0.05 | 0.21 to 0.39 | — | 0.0 |
| 10 | 2 | 0.02*** | — | — | 0.21 to 0.43 | 0.15 to 0.40 | 0.0 |
| 11 | 0 | 48 | 1 | 0.1 | 0.23 to 0.35 | 0.12 to 0.25 | 0.0 |
| 12 | 0 | 48 | 2 | 0.05 | 0.21 to 0.44 | 0.18 to 0.29 | 0.0 |
| Comparative Examples | | | | | | | |
| 1 | 0 | 0.01** | — | — | 0.12 to 0.19 | — | 4.5 |
| 2 | 3 | 4 | 0.5 | 0.2 | 0.12 to 0.19 | 0.20 to 0.37 | 2.3 |

TABLE 1-2-continued

|  | Number of furnace rocking | Time required for cooling from 1200 to 400° C. (h) | Water-spray cooling condition | | Concentration of S in slag (wt %) | Concentration of $B_2O_3$ in slag (wt %) | Detection of $Cr^{6+}$ (%) |
|---|---|---|---|---|---|---|---|
|  |  |  | Thickness of slag (m) | Amount of water spray (t/h·t · slag) |  |  |  |
| 3 | 0 | 24 | 2 | 0.1 | 0.65 to 0.89 | — | 5.7 |
| 4 | 0 | 24 | 1 | 0.05 | 0.37 to 0.55 | 0.18 to 0.40 | 3.0 |
| 5 | 3 | 0.02*** | — | — | 0.38 to 0.57 | 0.35 to 0.75 | 6.1 |
| 6 | 0 | 24 | 2 | 0.15 | 0.34 to 0.53 | 0.15 to 0.36 | 4.7 |
| 7 | 3 | 72 | 4 | 0.1 | 0.22 to 0.38 | 0.20 to 0.37 | 1.1 |

*Use of coke having a high concentration of S
**Cooling by water grinding
***Cooling by air grinding TABLE 2-1a Examples

|  | Grade of slag | Basicity of slag ($CaO/SiO_2$) | Concentration of Cr in slag before modification (wt %) | Sulfur-containing material | | Boron oxide-containing material | | Container in which sulfur-containing material has been placed |
|---|---|---|---|---|---|---|---|---|
|  |  |  |  | Kind | Amount (kg/t · slag) | Kind | Amount (kg/t · slag) |  |
| 13 | Decarburizing furnace slag | 1.3 to 1.8 | 1.0 to 3.5 | FeS | 10 | — | — | slag pot |
| 14 | VOD slag | 1.3 to 2.0 | 2.1 to 5.3 | FeS | 5 | — | — | slag pot |
| 15 | Electric furnace slag | 3.5 to 4.0 | 4.0 to 8.0 | FeS | 5 | — | — | slag pot |
| 16 | AOD slag | 1.6 to 2.1 | 1.9 to 4.1 | FeS | 5 | — | — | slag pot |
| 17 | Decarburizing furnace slag | 2.2 to 3.5 | 0.6 to 2.9 | FeS | 5 | Colemanite | 5 | slag pot |
| 18 | Decarburizing furnace slag | 1.5 to 2.2 | 1.8 to 4.0 | FeS | 5 | Borosilicate glass | 17 | slag pot |
| 19 | AOD slag | 1.9 to 2.6 | 3.3 to 4.6 | FeS | 5 | Sodium borate | 5 | slag pot |
| 20 | Electric furnace slag | 2.8 to 3.5 | 2.5 to 5.0 | FeS | 5 | Colemanite | 5 | slag pot |
| 21 | Decarburizing furnace slag | 1.3 to 2.0 | 2.2 to 4.2 | Blast furnace water-ground slag | 150 | Colemanite | 10 | slag pot |
| 22 | Decarburizing furnace slag | 1.3 to 1.8 | 1.0 to 3.5 | FeS | 10 | — | — | Converter |
| 23 | VOD slag | 1.3 to 2.0 | 2.1 to 5.3 | FeS | 5 | — | — | Converter |
| 24 | Electric furnace slag | 3.5 to 4.0 | 4.0 to 8.0 | FeS | 5 | — | — | Electric furnace |
| 25 | AOD slag | 1.6 to 2.1 | 1.9 to 4.1 | FeS | 5 | — | — | AOD |
| 26 | Decarburizing furnace slag | 2.2 to 3.5 | 0.6 to 2.9 | FeS | 5 | Colemanite | 5 | Converter |
| 27 | Decarburizing furnace slag | 1.5 to 2.2 | 1.8 to 4.0 | FeS | 5 | Borosilicate glass | 17 | Electric furnace |
| 28 | AOD slag | 1.9 to 2.6 | 3.3 to 4.6 | FeS | 5 | Colemanite | 5 | Electric furnace |
| 29 | Electric furnace slag | 2.8 to 3.5 | 2.5 to 5.0 | FeS | 5 | Sodium borate | 5 | Converter |
| 30 | Decarburizing furnace slag | 1.3 to 2.0 | 2.2 to 4.2 | Blast furnace water-ground slag | 150 | Colemanite | 10 | VOD |

**Cooling by water grinding
***Cooling by air grinding

TABLE 2-1b

Examples

|  | Amount of $N_2$ having been blown ($Nm^2/min · t$-slag) | Number of furnace rocking | Time required for cooling from 1200 to 400° C. (h) | Water-spray cooling condition | | Concentration of S in slag (wt %) | Concentration of $B_2O_3$ in slag (wt %) | Detection of $Cr^{6+}$ (%) |
|---|---|---|---|---|---|---|---|---|
|  |  |  |  | Thickness of slag (m) | Amount of water spray (t/h-t · slag) |  |  |  |
| 13 | — | — | 24 | 1 | 0.05 | 0.30 to 0.62 | — | 0.0 |
| 14 | — | — | 48 | 2 | 0.05 | 0.22 to 0.40 | — | 0.0 |
| 15 | — | — | 0.01** | — | — | 0.21 to 0.39 | — | 0.0 |

TABLE 2-1b-continued

Examples

| | Amount of N₂ having been blown (Nm²/min·t-slag) | Number of furnace rocking | Time required for cooling from 1200 to 400° C. (h) | Water-spray cooling condition | | Concentration of S in slag (wt %) | Concentration of $B_2O_3$ in slag (wt %) | Detection of $Cr^{6+}$ (%) |
|---|---|---|---|---|---|---|---|---|
| | | | | Thickness of slag (m) | Amount of water spray (t/h-t·slag) | | | |
| 16 | 0.3 | — | 24 | 1.5 | 0.2 | 0.22 to 0.39 | — | 0.0 |
| 17 | — | — | 12 | 0.5 | 0.05 | 0.22 to 0.38 | 0.20 to 0.40 | 0.0 |
| 18 | — | — | 0.02*** | — | — | 0.25 to 0.43 | 0.15 to 0.38 | 0.0 |
| 19 | — | — | 24 | 2 | 0.1 | 0.24 to 0.39 | 0.18 to 0.45 | 0.0 |
| 20 | 0.5 | — | 48 | 2 | 0.05 | 0.22 to 0.41 | 0.15 to 0.40 | 0.0 |
| 21 | — | — | 48 | 2 | 0.05 | 0.22 to 0.41 | 0.40 to 0.62 | 0.0 |
| 22 | — | 1 | 12 | 1 | 0.1 | 0.32 to 0.60 | — | 0.0 |
| 23 | 0.5 | 1 | 0.01** | — | — | 0.25 to 0.41 | — | 0.0 |
| 24 | — | — | 48 | 2 | 0.05 | 0.20 to 0.39 | — | 0.0 |
| 25 | — | — | 0.02*** | — | — | 0.22 to 0.43 | — | 0.0 |
| 26 | — | — | 24 | 1 | 0.1 | 0.20 to 0.42 | 0.15 to 0.38 | 0.0 |
| 27 | — | 2 | 12 | 1 | 0.2 | 0.23 to 0.46 | 0.19 to 0.39 | 0.0 |
| 28 | 0.3 | — | 48 | 1.5 | 0.05 | 0.28 to 0.41 | 0.16 to 0.47 | 0.0 |
| 29 | — | — | 48 | 2 | 0.05 | 0.20 to 0.45 | 0.16 to 0.40 | 0.0 |
| 30 | — | — | 24 | 2 | 0.07 | 0.22 to 0.41 | 0.37 to 0.55 | 0.0 |

**Cooling by water grinding
***Cooling by air grinding

TABLE 2-2a

Comparative Examples

| | Grade of slag | Basicity of slag ($CaO/SiO_2$) | Concentration of Cr in slag before modification (wt %) | Sulfur-containing material | | Boron oxide-containing material | | Container in which sulfur-containing material has been placed |
|---|---|---|---|---|---|---|---|---|
| | | | | Kind | Amount (kg/t·slag) | Kind | Amount (kg/t·slag) | |
| 8 | Decarburizing furnace slag | 4.1 to 4.9 | 0.7 to 2.5 | FeS | 5 | Colemanite | 5 | slag pot |
| 9 | Decarburizing furnace slag | 1.5 to 2.2 | 1.5 to 3.5 | FeS | 2 | — | — | slag pot |
| 10 | Electric furnace slag | 4.3 to 5.1 | 1.4 to 4.4 | FeS | 10 | Colemanite | 5 | slag pot |
| 11 | AOD slag | 1.5 to 2.2 | 3.0 to 5.8 | FeS | 2 | Colemanite | 10 | slag pot |
| 12 | VOD slag | 4.2 to 5.0 | 2.0 to 4.8 | FeS | 10 | Borosilicate glass | 17 | slag pot |
| 13 | Decarburizing furnace slag | 4.1 to 4.9 | 0.7 to 2.5 | FeS | 5 | Colemanite | 5 | Converter |
| 14 | Decarburizing furnace slag | 1.5 to 2.2 | 1.5 to 3.5 | FeS | 2 | — | — | Electric furnace |
| 15 | Electric furnace slag | 4.3 to 5.1 | 1.4 to 4.4 | FeS | 10 | Colemanite | 5 | Electric furnace |
| 16 | AOD slag | 1.5 to 2.2 | 3.0 to 5.8 | FeS | 2 | Sodium borate | 10 | Converter |
| 17 | VOD slag | 4.2 to 5.0 | 2.0 to 4.8 | FeS | 10 | Borosilicate glass | 17 | VOD |
| 18 | Decarburizing furnace slag | 1.5 to 2.2 | 1.8 to 4.0 | FeS | 5 | Colemanite | 5 | Electric furnace |

**Cooling by water grinding
***Cooling by air grinding

TABLE 2-2b

Comparative Examples

| | Amount of N₂ having been blown (Nm²/min·t-slag) | Number of furnace rocking | Time required for cooling from 1200 to 400° C. (h) | Water-spray cooling condition | | Concentration of S in slag (wt %) | Concentration of $B_2O_3$ in slag (wt %) | Detection of $Cr^{6+}$ (%) |
|---|---|---|---|---|---|---|---|---|
| | | | | Thickness of slag (m) | Amount of water spray (t/h-t·slag) | | | |
| 8 | — | — | 24 | 1.5 | 0.1 | 0.29 to 0.47 | 0.17 to 0.38 | 4.5 |
| 9 | — | — | 12 | 1 | 0.15 | 0.10 to 0.19 | — | 2.9 |
| 10 | 0.5 | — | 48 | 2 | 0.05 | 0.37 to 0.55 | 0.16 to 0.40 | 3.0 |

TABLE 2-2b-continued

Comparative Examples

| | Amount of N$_2$ having been blown (Nm$^2$/min · t-slag) | Number of furnace rocking | Time required for cooling from 1200 to 400° C. (h) | Water-spray cooling condition | | Concentration of S in slag (wt %) | Concentration of B$_2$O$_3$ in slag (wt %) | Detection of Cr$^{6+}$ (%) |
|---|---|---|---|---|---|---|---|---|
| | | | | Thickness of slag (m) | Amount of water spray (t/h-t · slag) | | | |
| 11 | — | — | 24 | 1 | 0.05 | 0.08 to 0.15 | 0.33 to 0.7 | 4.5 |
| 12 | — | — | 12 | 1 | 0.1 | 0.34 to 0.53 | 0.14 to 0.36 | 1.8 |
| 13 | 0.5 | 3 | 0.01** | — | — | 0.31 to 0.43 | 0.15 to 0.41 | 3.2 |
| 14 | — | — | 0.02*** | — | — | 0.13 to 0.19 | — | 3.0 |
| 15 | — | — | 48 | 2 | 0.05 | 0.36 to 0.50 | 0.18 to 0.38 | 3.5 |
| 16 | — | — | 24 | 1 | 0.1 | 0.10 to 0.16 | 0.35 to 0.67 | 3.8 |
| 17 | — | — | 12 | 0.5 | 0.05 | 0.34 to 0.56 | 0.15 to 0.33 | 1.5 |
| 18 | — | 2 | 72 | 2 | 0.01 | 0.23 to 0.44 | 0.18 to 0.37 | 0.5 |

**Cooling by water grinding
***Cooling by air grinding

INDUSTRIAL APPLICABILITY

According to the present invention, Cr$^{6+}$ can be completely prevented from becoming eluted from stainless steel slag containing chromium oxide as explained herein above. Especially, even when the concentration of Cr in the slag is high and beyond 2.5% by weight, it is possible to prevent the elution of Cr$^{6+}$ in a complete manner. Thus, the stainless steel slag with a high concentration Cr can be effectively utilized, with no fear of environmental pollution, as a roadbed material or a reclamation material for civil works.

What is claimed is:

1. A method for preventing the elution of Cr$^{6+}$ from slag resulting from the refining of stainless steel, which comprises of steps of:
    adjusting slag in a molten state formed at a step of refining stainless steel such that a resulting molten slag has a basicity in the range of 1.3–4.0,
    setting a concentration of sulfur in the basicity-adjusted molten slag to be not less than 0.2% by weight by mixing the molten slag with a sulfur-containing material, wherein the sulfur of the sulfur-containing material is zero or minus in valence, and
    after setting a concentration of sulfur in the molten slag to be not less than 0.2% by weight, cooling the molten slag by quenching at such a speed of cooling that the temperature of the slag is decreased from 1200° C. to 400° C. within 48 hours,
    wherein elution of Cr6+ from the slag is prevented.

2. A method for preventing the elution of Cr$^{6+}$ from slag resulting from the refining of stainless steel according to claim 1, wherein the mixing is carried out by flushing the molten slag having been adjusted in its basicity in a slag receiver after or during addition of the sulfur-containing material to the slag receiver.

3. A method for preventing the elution of Cr$^{6+}$ from slag resulting from the refining of stainless steel according to claim 1, wherein the mixing is carried out by maintaining the molten slag having been adjusted in its basicity in a slag receiver structured to heat the slag, and by adding the sulfur-containing material to the slag receiver.

4. A method for preventing the elution of Cr$^{6+}$ from slag resulting from the refining of stainless steel according to claim 1, wherein the mixing is carried out by adding the sulfur-containing material to the molten slag having been adjusted in its basicity and left in a refining furnace after tapping of the stainless steel.

5. A method for preventing the elution of Cr$^{6+}$ from slag resulting from the refining of stainless steel according to claim 1, wherein the refining is performed in an electric furnace, and the sulfur-containing material is added to the molten slag having been adjusted in its basicity.

6. A method for preventing the elution of Cr$^{6+}$ from slag resulting from the refining of stainless steel according to claim 1, wherein the molten slag is stirred by at least one selected from the group consisting of a process for rocking a furnace having the slag contained therein, and a process for blowing a gas into the slag.

7. A method for preventing the elution of Cr$^{6+}$ from slag resulting from the refining of stainless steel according to claim 1, wherein the sulfur-containing material is FeS.

8. A method for preventing the elution of Cr$^{6+}$ from slag resulting from the refining of stainless steel according to claim 1, wherein a boron oxide-containing material is further mixed at a step of mixing the sulfur-containing material.

9. A method for preventing the elution of Cr$^{6+}$ from slag resulting from the refining of stainless steel according to claim 8, wherein the concentration of B$_2$O$_3$ in the slag is set to be not less than 0.1% by weight by mixing the slag with the boron oxide-containing material.

10. A method for preventing the elution of Cr$^{6+}$ from slag resulting from the refining of stainless steel according to claim 1, wherein the quenching is performed by at least one of a water-grinding, an air-grinding process, and a process in which cooling is effected by sprinkling of water in a quantity larger than 0.05 t/h based on 1 t of the slag having been flushed to have a thickness within 2 m and a temperature higher than 1200° C.

11. A method for preventing the elution of Cr$^{6+}$ from slag resulting from a process of the refining of stainless steel, the method comprising the steps of:
    adjusting the basicity of the slag in the molten state to a value in the range of 1.3–4.0;
    after adjusting the basicity, mixing the basicity-adjusted slag with sulfur of a valence of zero to set the concentration of sulfur in the slag to not less than 0.2% by weight to prevent elution of hexavalent chromium from the slag; and
    after setting a concentration of sulfur in the slag to be not less than 0.2% by weight, cooling the slag by quenching at such a speed of cooling that the temperature of the slag is decreased from 1200° C. to 400° C. within 48 hours,
    wherein elution of Cr6+, from the slag into water, is prevented.

12. The method according to claim 11, wherein the mixing is carried out by flushing the basicity adjusted molten slag in a slag receiver after or during addition of the sulfur to the slag receiver.

13. The method according to claim 11, wherein the mixing is carried out by maintaining the basicity adjusted molten slag in a slag receiver structured to heat the slag, and by adding the sulfur to the slag receiver.

14. The method according to claim 11, wherein the mixing is carried out by adding the sulfur to the basicity adjusted molten slag left in a refining furnace after tapping of the stainless steel.

15. The method according to claim 11, wherein the refining is performed in an electric furnace, and the sulfur is added to the basicity adjusted molten slag.

16. The method according to claim 11, wherein the molten slag is stirred by at least one selected from the group consisting of a process for rocking a furnace having the slag contained therein, and a process for blowing a gas into the slag.

17. The method according to claim 11, further comprising mixing a boron oxide-containing material at the step of mixing the sulfur.

18. The method according to claim 17, wherein the concentration of $B_2O_3$ in the slag is set to be not less than 0.1% by weight by mixing the slag with the boron oxide-containing material.

19. A method for preventing the elution of $Cr^{6+}$ from slag resulting from a process of the refining of stainless steel, the method comprising the sequential steps of:

adjusting the basicity of the slag in the molten state to a value in the range of 1.3–4.0;

after adjusting the basicity, mixing the basicity-adjusted slag with a sulfur-containing material, having sulfur of a valence of zero or minus, to set the concentration of sulfur in the slag to not less than 0.2% by weight; and after setting a concentration of sulfur in the slag to be not less than 0.2% by weight, cooling the slag by quenching to reduce a temperature of the slag from 1200° C. to 400° C. within 48 hours, wherein elution of Cr6+, from the quenched slag into water, is prevented.

20. The method of claim 19, wherein, the basicity-adjusted slag is maintained a slag receiver, the sulfur-containing material is added, while the basicity-adjusted slag remains in the slag receiver, and the added sulfur-containing material is mixed into the slag, in the slag receiver, by one of rocking the receiver and blowing a gas into the slag.

\* \* \* \* \*